(12) United States Patent  
Lukos

(10) Patent No.: US 7,134,473 B2  
(45) Date of Patent: Nov. 14, 2006

(54) ANTI-BOW ROLLER TUBE ARRANGEMENT

(76) Inventor: Stephen Lukos, 1879 Litchfield Rd., Watertown, CT (US) 06795

(*) Notice: Subject to any disclaimer, the term of this patent is extended or adjusted under 35 U.S.C. 154(b) by 13 days.

(21) Appl. No.: 10/943,302

(22) Filed: Sep. 17, 2004

(65) Prior Publication Data

US 2006/0060312 A1 Mar. 23, 2006

(51) Int. Cl.
*A47G 5/02* (2006.01)

(52) U.S. Cl. .................. 160/242; 160/323.1; 160/903

(58) Field of Classification Search ........... 160/242, 160/323.1, 250, 903, DIG. 11, 405; 242/595.1; 248/266, 267, 268, 269, 270, 271, 272, 273
See application file for complete search history.

(56) References Cited

U.S. PATENT DOCUMENTS

| | | | |
|---|---|---|---|
| 477,512 A | 6/1892 | Combis et al. | |
| 1,595,234 A * | 8/1926 | Kuyper | 160/23.1 |
| 1,615,830 A * | 2/1927 | Derus | 242/595.1 |
| 1,671,545 A * | 5/1928 | Reuther | 160/242 |
| 1,742,549 A | 1/1930 | MacArthur et al. | |
| 1,812,416 A * | 6/1931 | Smith | 242/595.1 |
| 1,825,198 A * | 9/1931 | Bruno | 160/242 |
| 2,248,414 A * | 7/1941 | Schane | 242/595.1 |
| 2,326,642 A * | 8/1943 | Heiser | 242/595.1 |
| 2,894,578 A | 4/1959 | Caesar et al. | |
| 3,421,568 A | 1/1969 | Youngs | |
| 3,882,921 A * | 5/1975 | Sandall | 160/266 |
| 3,900,063 A | 8/1975 | Roller | |
| 4,347,886 A * | 9/1982 | von Knorring | 160/242 |
| 5,121,782 A * | 6/1992 | Renkhoff et al. | 160/22 |
| 5,423,506 A | 6/1995 | Spoon | |
| 5,819,831 A * | 10/1998 | Schanz | 160/133 |
| 2004/0129850 A1 | 7/2004 | Kirby | |

FOREIGN PATENT DOCUMENTS

| | | |
|---|---|---|
| DE | 196 54 668 | 4/1998 |
| EP | 0 745 742 | 12/1996 |
| EP | 0 792 978 | 9/1997 |
| EP | 1 030 003 | 8/2000 |

* cited by examiner

*Primary Examiner*—David Purol
(74) *Attorney, Agent, or Firm*—Lipsitz & McAllister, LLC

(57) ABSTRACT

A roller tube support mechanism includes a roller tube including a roller tube body. The roller tube is configured to support a sheet material wound around the roller tube body along a length of the roller tube body between a first end and a second end of the roller tube body. An assembly includes a first mount and a second mount opposite the first mount. The assembly is configured to support the roller tube rotatably coupled to the first mount and the second mount. A support cradle is coupled to the assembly between the first mount and the second mount. The support cradle is configured to support the roller tube along the length of the roller tube.

19 Claims, 4 Drawing Sheets

ANTI-BOW ROLLER TUBE ARRANGEMENT

BACKGROUND

The present invention relates to solar screens and awnings, and more particularly, to a roller tube and assembly for a solar screen or awning including an integral support cradle.

Conventional roller shade systems make use of flexible shades supported by elongated roller tubes. The roller tube, typically made from aluminum or steel, is rotatably supported and provides support for the flexible shade on the roller tube. Roller shades include manual shades having spring driven roller tubes and motorized shades having drive motors engaging the roller tube to rotatingly drive the tube. The drive motors for motorized shades include externally mounted motors engaging an end of the roller tube and internal motors that are received within an interior defined by the tube.

Conventional roller shades have support systems that engage the opposite ends of the roller tube to provide the rotatable support that is required for winding and unwinding of the flexible shade. The support system includes a drive end support assembly having a coupler engaging the open end of the tube for rotation. The coupler is adapted to receive the drive shaft of a motor such that rotation of the drive shaft is transferred to the coupler for rotation of the tube. The motor is secured to a bracket for attachment of the roller shade system to the wall or ceiling of a structure, for example. A coupler engaging an opposite end of the roller tube could receive a motor drive shaft or, alternatively, could receive a rotatably supported shaft of an idler assembly.

A roller shade tube supported in a conventional manner from the opposite ends will deflect in response to transverse loading, from the weight of an attached shade for example. The response of a roller tube, supported at its ends in a conventional manner, from the weight of a flexible shade as well as from self-weight of the tube, results in a downward "sagging" deflection in a central portion of the roller tube with respect to the supported ends.

For roller tube used with wider shades (e.g., widths of 10 to 30 feet or more), support of the correspondingly long roller tubes in a conventional manner can result in sagging deflection detrimental to the appearance of a supported shade. V-shaped wrinkles, also known as "smiles", can be formed in an unrolled shade supported by a sagging roller tube. Sagging deflection in a conventionally supported roller tube can also have a detrimental effect on shade operation. During winding of a shade, the shade is drawn onto the tube in a direction that is substantially perpendicular to the axis of the tube. Due to curvature along the length of a sagging tube, opposite end portions of a supported shade will tend to track towards the center portion of the tube as the shade is rolled onto the tube. Such uneven tracking of opposite end portions of the shade can cause the end portions to be wound more tightly onto the end portions of the roller tube than the central portion of the roller tube. As a result, the central portion of the shade is not pulled tightly to the tube causing it to tend to buckle. This buckling of the central portion of the shade, if severe enough, can create variations in radial dimensions of the rolled shade along the length of the tube, thereby impairing subsequent rolling of lower portions of the shade. Uneven tracking can also cause surface discontinuities, known as "golf balls," that include a permanent sagging pocket shaped discontinuity in the shade material.

The problem of sagging deflection in longer roller tubes has been addressed in prior art roller shades by increasing the diameter of the roller tube.

Although increase of the roller tube diameter serves to reduce sagging deflection in conventional end-supported tubes, there are undesirable consequences associated with such a solution. Increasing the diameter of the roller tube increases weight, thereby potentially affecting the size and type of structure capable of providing rotatable support for the tube. Also, additional space required by the larger diameter roller tube and its associated support structure may not be readily available in many installations. Even if space is available, the bulky nature of the system due to the required large roller tube diameter is often objectionable for aesthetic reasons.

Other prior art attempts at preventing sagging involve the use of center supports and/or elongate support rollers in a variety of configurations located below the rotational axis of the roller tube. The elongate support rollers add weight and complexity to the roller tube system. The increased costs and failure mechanisms inherent in the more complex support systems diminish the advantages provided.

It would be advantageous to provide a method and an apparatus to ensure that roller tube sagging is prevented without the added costs and complexity of the prior art systems. The present invention provides the aforementioned and other advantages.

What is needed in the art is a roller tube support mechanism having a fixed support cradle.

SUMMARY

In accordance with the present invention, a support mechanism comprises a roller tube including a body. The roller tube is configured to support a sheet material wound around the roller tube body along a length of the body between a first end and a second end of the body. An assembly includes a first mount and a second mount opposite the first mount. The assembly is configured to support the roller tube rotatably coupled to the first mount and the second mount. A support cradle is coupled to the assembly between the first mount and the second mount. The support cradle is configured to support the roller tube along the length of the roller tube.

In an exemplary embodiment, the body can have a cylindrical shape. The sheet material can be one of a screen and fabric configured to shade sunlight. The assembly can be configured to releasably contain the roller tube and sheet material thereon and discharge the sheet material proximate the support cradle. The first mount and second mount can be configured provide both rotary support and translational support to the roller tube. Each of the first and second mounts can include at least one slot formed in the assembly at each of the first and second ends respectively.

The configuration can include a central slot bounded by two opposing side slots, wherein the central slot is configured to support an idler and the opposing side slots can be configured to support at least one of a motor and a drive gear. The slot can be configured to guide and support the roller tube responsive to a variable diameter of the roller tube and sheet material. In another exemplary embodiment, the first and second mounts each can include a slotted insert configured to couple to the first and second ends of the assembly. The slotted insert can include an idler groove between a pair of side grooves. The pair of side grooves can be configured to support at least one of a motor bearing and a drive gear bearing. The slotted insert can be concealable in an interior of the assembly. Each of the first and second mounts can include a pivot arm assembly configured to support the roller tube. The pivot arm assembly can be pivotably coupled to the assembly proximate the first mount and the second mount respectfully and concealable in the interior of the assembly. The pivot arm assembly can include an idler receiver and a set of opposing receivers adjacent the idler receiver. The pivot arm assembly can be configured to guide and support the roller tube responsive to a variable diameter of the roller tube and sheet material. The support cradle can be fixed with respect to the assembly and the roller tube. The support cradle can be crescent shaped. The support cradle can contact the sheet material proximate a lower portion of the roller tube. The support cradle can be formed integral with the assembly. The support cradle can support the roller tube and sheet material below an axis of rotation of the roller tube. The support cradle can support the roller tube body substantially along the entire length of the tube body. The support cradle can continuously support the roller tube body and the sheet material along the length responsive to variation of a diameter of the sheet material wound around the roller tube body resulting from winding and unwinding the sheet material around the roller tube body.

An exemplary method of supporting a roller tube is provided. The method provides for disposing a sheet material on the roller tube. The roller tube includes a body having a first end and a second end. The sheet material can be wound around the roller tube body along a length of the body between the first end and the second end. The roller tube can be mounted in an assembly. The assembly can include a first mount and a second mount opposite thereof. The roller tube can be supported on the first and second mounts wherein the roller tube is rotatable for winding and unwinding the sheet material on the roller tube. The method includes supporting the roller tube along the length on a support cradle coupled to the assembly. The support cradle can be integrally fixed to the assembly.

In an exemplary embodiment, the invention provides for supporting the roller tube at each of the first and second mounts in both a rotary motion and a translational motion responsive to a variable diameter of the sheet material on the roller tube. The first and second mounts comprise one of a slot formed in the assembly and a slotted insert mounted in an interior of the assembly and a pivot arm assembly mounted in the interior. The method provides for concealing the first and second mounts in an interior of the assembly. The roller tube can be prevented from deflection along the length by the cradle support. Surface discontinuities can be prevented along a surface of the sheet material responsive to unwinding the sheet material across the cradle support.

BRIEF DESCRIPTION OF THE FIGURES

Referring now to the figures, wherein like elements are numbered alike.

DETAILED DESCRIPTION

The disclosure provides an exemplary roller tube support mechanism. The roller tube support mechanism can include an assembly including a first mount and a second mount opposite each other. The assembly can be configured to support a roller tube rotatably coupled to the first mount and the second mount. The roller tube includes a body defining a length between a first end and a second end. The roller tube can be configured to support a sheet material wound around the roller tube body along the length of the body between the first and second ends of the body. A support cradle can be coupled to the assembly between the first and second mounts. The support cradle can be configured to support the roller tube along the length of the roller tube. The sheet material can comprise one of a solar screen or awning material for an awning, such as lateral arm awnings or retractable window awnings.

Figure 1:
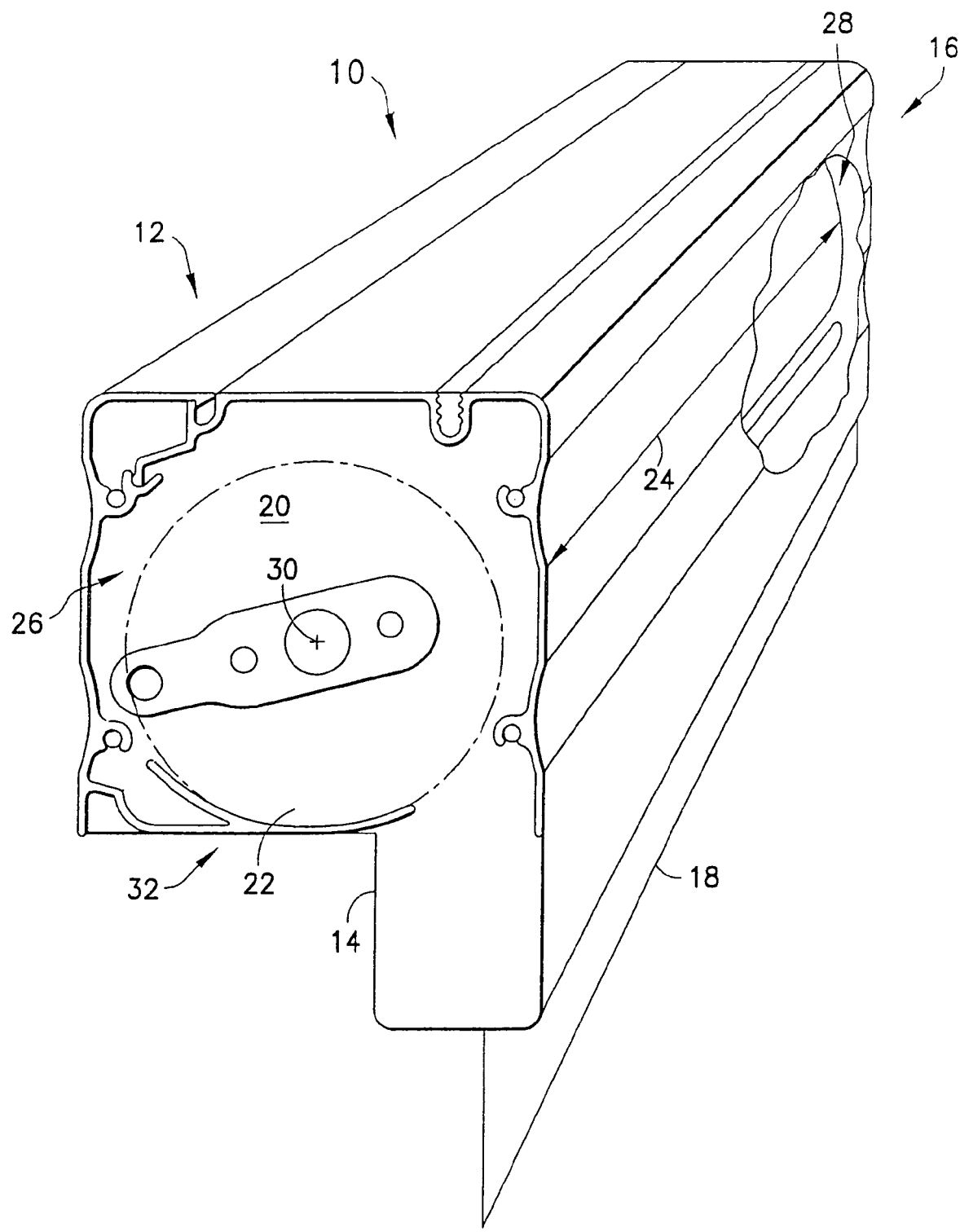
FIG. 1 is a perspective view of an exemplary roller tube support mechanism.
Figure 2:
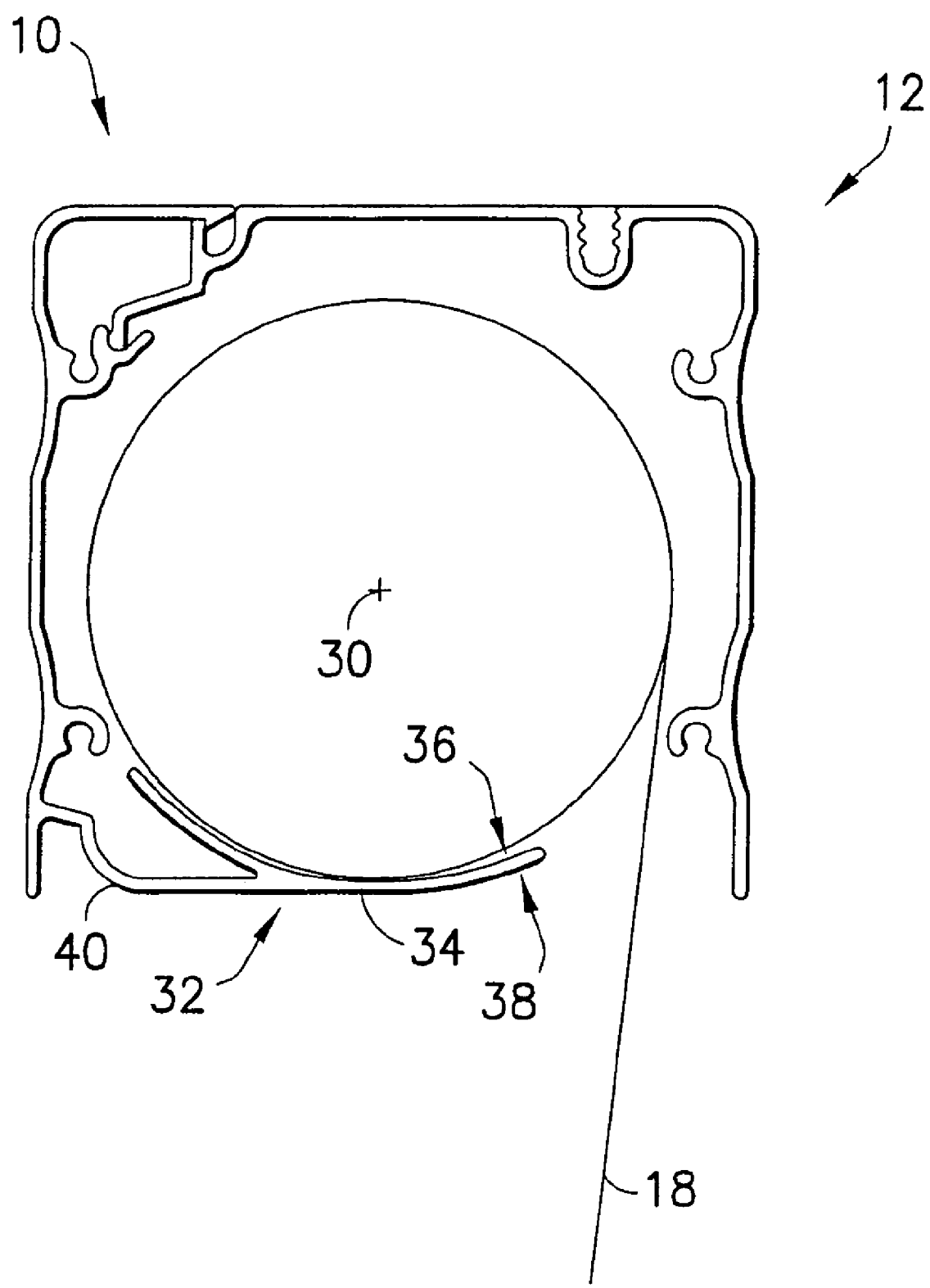
FIG. 2 is a side view of an exemplary roller tube support mechanism.

FIGS. 1 and 2 illustrate exemplary embodiments of the roller tube mechanism 10. The roller tube mechanism 10 includes a assembly 12 that extends laterally between a first mount 14 and a second mount 16 opposite the first mount 14. The assembly 12 can be mounted on a wall, ceiling, or the like, to provide a stable position to deploy a sheet material 18. The assembly 12 can be constructed of a rigid material through various means including, for example, extruded aluminum, and the like.

A roller tube 20 is rotatably mounted in the assembly 12. The roller tube 20 can be pivotably supported on the first mount 14 and second mount 16. The roller tube 20 includes a body 22 that extends along a length 24 between a first end 26 and a second end 28. The roller tube body 22 can have a cylindrical shape including a circular cross-section extending along the length 24. The roller tube 20 is configured to support the sheet material 18, such as solar screen material. The sheet material 18 can be wound around the roller tube 20 about an axis of rotation (axis) 30 of the roller tube 20. As the sheet material 18 is wound (wrapped) around the roller tube body 22, the diameter of the roller tube 20 and sheet material 18 increases. As the sheet material is unwound, the diameter of the roller tube 20 and sheet material 18 decreases.

A support cradle 32 is coupled to the assembly 12. The support cradle 32 extends between the first mount 14 and the second mount 16. The support cradle 32 is configured to support the roller tube 20 and sheet material 18 wound thereon. More specifically, the support cradle 32 supports the roller tube 20 along the entire length 24 of the roller tube 20. The roller tube 20 is prevented from bowing along the length 24 due to the support from the support cradle 32. In an exemplary embodiment, the support cradle 32 can comprise a portion of the assembly 12. In another embodiment, the support cradle 32 can be formed separate from the assembly 12 and coupled to the assembly 12.

The support cradle 32 is positioned such that the roller tube 20 and sheet material 18 rest on top of the support cradle 32. The support cradle 32 can be positioned such that an upper surface 36 contacts the sheet material near a lower portion of the roller tube 20 below the axis 30. The support cradle 32 can support the roller tube 20 and sheet material 18 throughout the winding and unwinding of the sheet material 18 during which the outer diameter of the sheet material 18 on the roller tube 20 varies.

The support cradle 32 comprises a base 34 including the upper surface 36 and a lower surface 38. The base 34 can be formed into an elongate arcuate beam cupped to support the arcuate shape of the outer diameter of the roller 20 and sheet material 18 wrapped on the roller 20. The base 34 can include a width that extends outward a distance sufficient to support the roller 20 without snagging or binding to roller 20. In another exemplary embodiment, the base 34 can include a width approximately the size of a quarter of the outer perimeter of the roller 20 and sheet material 18 thereon. A coupling arm 40 can extend from the lower surface 38 and couple to the assembly 12. In a preferred embodiment, the base 34 can have a crescent shaped cross-section. In another embodiment, the base 34 can be a circular cross-section, or the like. The shape of the support cradle 32 can substantially mate to the shape of the roller tube 20 and sheet material 18. In a preferred exemplary embodiment, the upper surface can include a coating (not shown) that enables the sheet material 18 to slide across the support cradle upper surface 36 without sticking, being marked, or discolored. Preferably, the upper surface 36 is coated (e.g., painted) to prevent the surfaces of the sheet material 18 from being marked (e.g., by aluminum oxide) as the material 18 unwinds. Alternatively, the support cradle 32 can be manufactured using a material such as high-density polyurethane, PVC, or the like. The support cradle 32 is rigid and does not move relative to the roller tube 20, sheet material 18 or assembly 12. The support cradle 32 can extend the entire length 24 of the roller tube 20 in a preferred embodiment. It is also contemplated that the support cradle 32 can extend substantially the length 24 of the roller tube 20 and variations thereof. In an exemplary embodiment, the support cradle 32 can be integrally formed from the assembly 12. The support cradle 32 can extend in a single contiguous length. In another embodiment, the support cradle 32 can include segmentation and discontinuities along the length and/or the width of the base 34. The support cradle 32 prevents the roller tube 20 from deflecting along the length 24 and resultantly prevents surface discontinuities from forming in the sheet material 18 as the sheet material 18 is dispensed out of the assembly 12.

Figure 3:
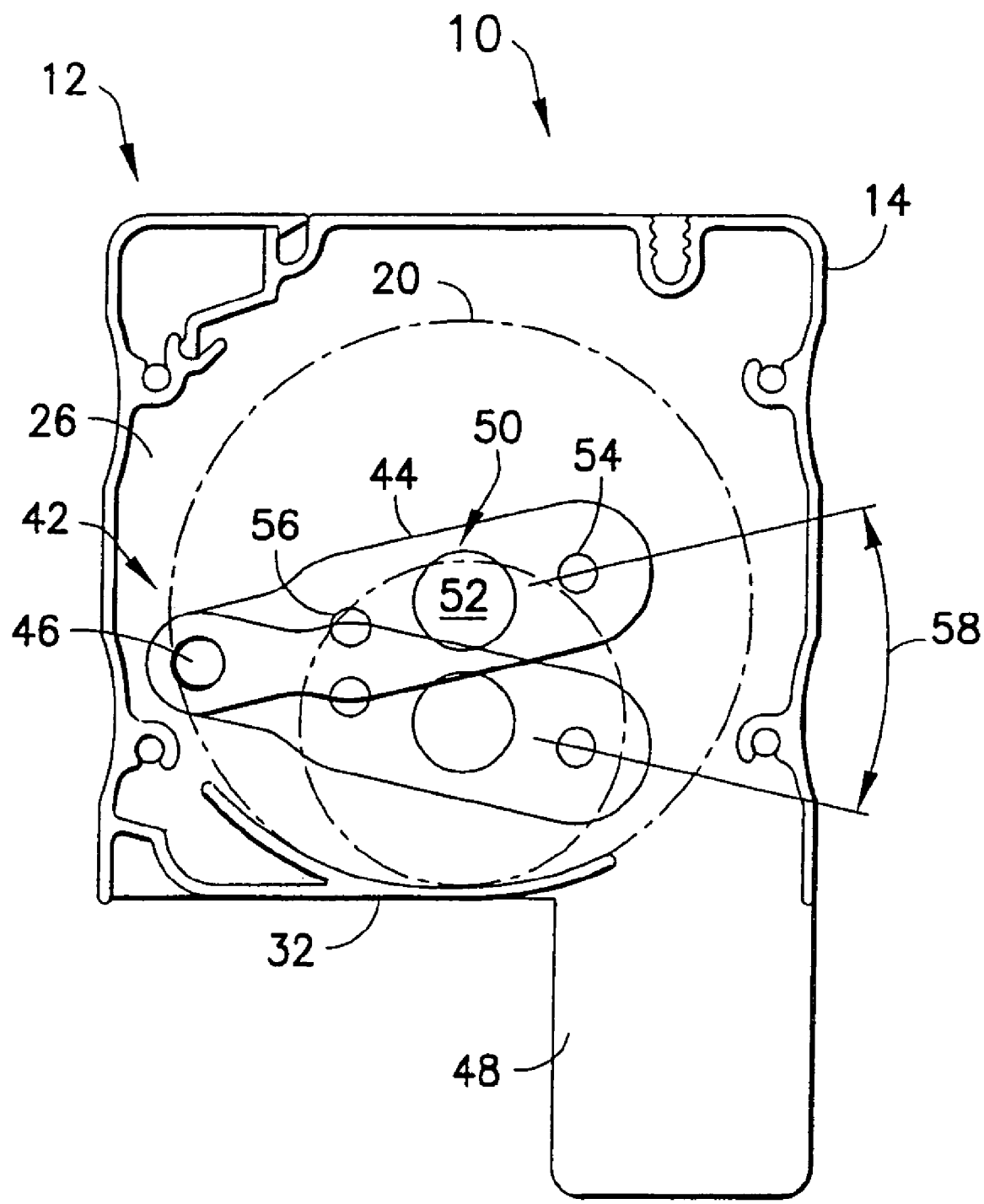
FIG. 3 is a side view of an exemplary roller tube support mechanism.

Referring to FIG. 3, an exemplary roller tube mechanism 10 is illustrated from a side view. The roller tube 20 is supported on both ends 26 and 28, by the first mount 14 and second mount 16. The first and second mounts 14,16 include a configuration for receiving bearings and drive mechanisms of the roller tube 20. In the preferred exemplary embodiment illustrated in FIG. 3, the mounts 14, 16 comprise a pivot arm assembly 42. The pivot arm assembly 42 includes a body 44 having a pivot mount 46 coupled to a cover plate 48. The body 44 includes at least one bearing mount 50, and in a preferred exemplary embodiment, a central bearing receiver 52 bounded by opposing receivers 54, 56. The central bearing receiver 52 can receive an idler of the roller tube 20 and the opposing receivers 54, 56 can receive at least one of a drive motor and drive gears (not shown) or a pull chain and clutch mechanism (tape drive or chain drive) for the roller tube 20. In an exemplary embodiment, the drive motor can be mounted inside the roller tube for a compact arrangement. The appropriate gearing and drive mechanism can be coupled to the drive motor as is known in the art.

The pivot arm assembly 42 illustrated in FIG. 3 is shown with a ghost image of the pivot arm assembly 42 to indicate the range of motion and capacity to pivot up and down with the roller tube 20. In a preferred exemplary embodiment, the pivot arm assembly 42 can swing about pivot mount 46 through an angle 58. The angle 58 can include a range from about zero degrees to about 45 degrees depending on the roller tube 20 size and expected service. The first and second mounts 14, 16 are configured to support the roller tube 20 throughout the range of travel within the assembly 12. As the sheet material 18 winds and unwinds on the roller tube 20, the outside diameter of the roller tube 20 and material 18 wrapped thereon changes. The roller tube axis 30 moves relative to the cover plate 48 and fixed support cradle 32 (i.e., rotation and translation). Since the axis 30 translates as the roller tube 20 rotates about the axis 30, the receivers 52, 54, 56 should also move with the roller tube 20 and accompanying drive motor, gears and idlers associated with the roller tube 20. The exemplary embodiment of the pivot arm assembly 42 provides both the rotary support as well as the lateral support for the roller tube 20 while maintaining the roller tube 20 supported by the fixed support cradle 32. It is noted that the pivot mount 46 may be slightly elongated to maintain the roller tube 20 centered over the support cradle 36.

Figure 4:
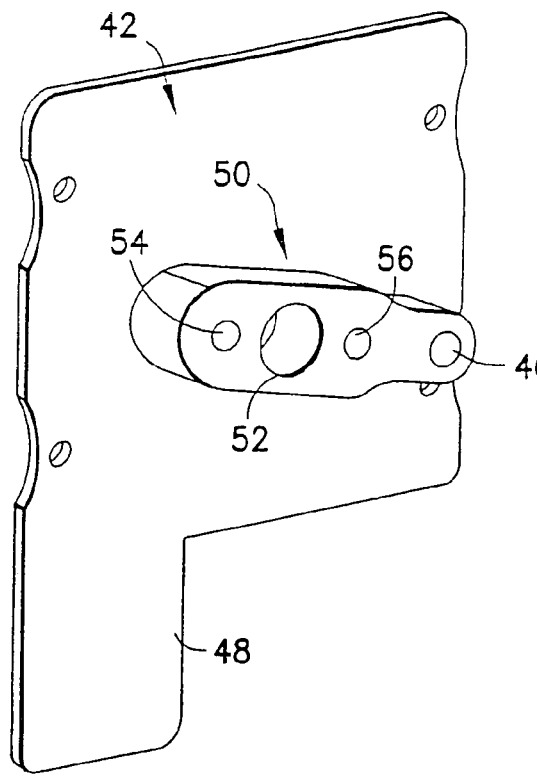
FIG. 4 is a perspective view of an exemplary mount.
Figure 5:
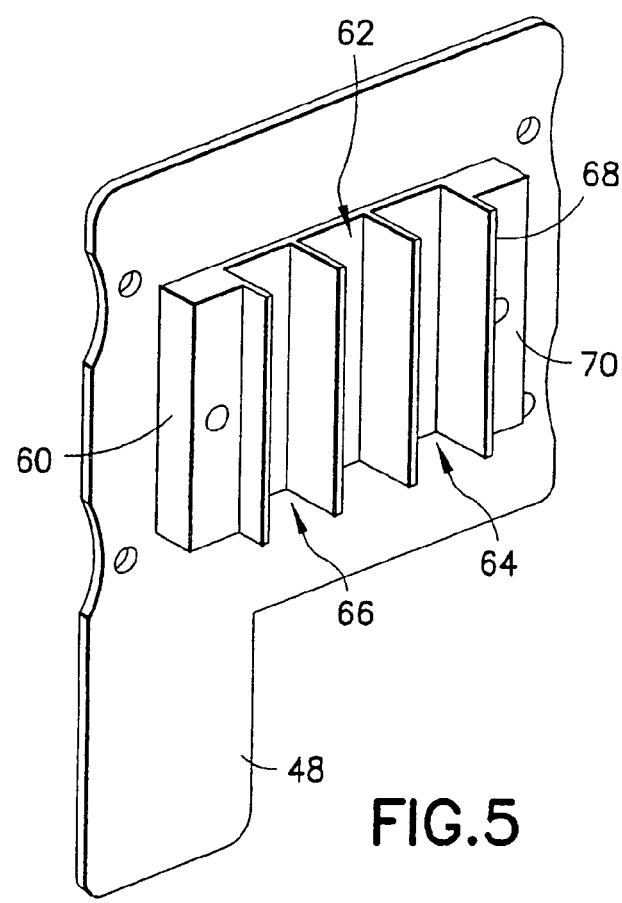
FIG. 5 is a perspective view of another exemplary mount.
Figure 6:
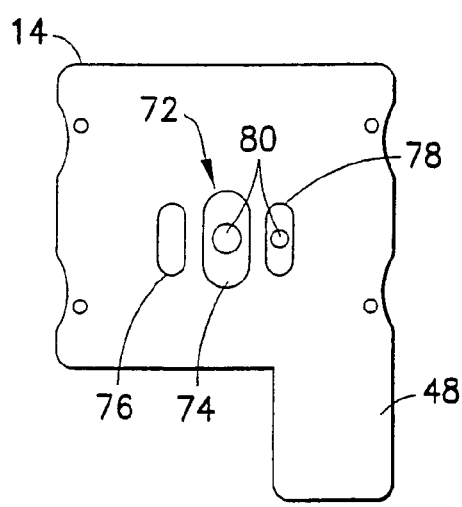
FIG. 6 is a perspective view of another exemplary mount.

FIGS. 4 through 6 are side views of exemplary mounts 14, 16. FIG. 4 illustrates the pivot arm assembly 42, similar to the embodiment illustrated in FIG. 3. The pivot arm assembly 42 embodiment allows the roller tube 20 to be supported while concealing the mechanism. A superior appearance can be gained through concealing the pivot arm assembly 42 inside the assembly 12. Another embodiment is concealed behind the cover plate 48 of the mounts 14 and 16 as shown in FIG. 5.

A slotted insert 60 is attachable to the cover plate 48 of the mount 14, 16. The slotted insert 60 serves the same function as the pivot arm assembly 42, of supporting the roller tube 20 in both translation and rotation. The slotted insert 60 includes an idler groove 62 formed between a pair of side grooves 64, 66. The idler groove 62 and side grooves 64, 66 can be formed as raised flanges 68 extending from a base 70. In another exemplary embodiment, the idler groove 62 and side grooves 64, 66 can be machined into the base 70, cast in the base 70, attached to the base 70, and the like. The centrally located idler groove 62 can receive a bushing or bearing axle of an idler (see FIG. 6) coupled to the roller tube 20. The side grooves 64, 66 can receive a bushing or bearing or axle of a drive motor and/or gears (see FIG. 6) of the roller tube 20. The slotted insert 60 is also concealed behind the cover plate 48 and provides an aesthetic quality to the assembly 12. A less elaborate embodiment can include slots formed in the cover plate 48, as shown in FIG. 6.

The embodiment of FIG. 6 includes at least one slot 72 formed in the cover plate 48 of the mount 14, 16. A central slot 74 and opposing side slots 76, 78 can be formed in the mounts 14, 16 to support the roller tube in both rotation and translation. The less complex embodiment of the slots 74, 76, 78 reduces manufacturing with an aesthetic tradeoff, since the ends of the bearings, axles and bushings, shown generally as 80, are visible from the exterior of the assembly 12.

The exemplary roller tube support mechanism disclosed herein provides the advantage of supporting the roller tube without the need for complex moving parts. The roller tube and sheet material wrapped around the roller tube can be supported along the entire length. The problem of bowing and sagging across the roller tube and the resultant smile-shaped surface discontinuities on the sheet material are prevented as a result of the novel support mechanism. Further advantages of the disclosed roller tube support mechanism include the support cradle and assembly being formed integral improving strength, lowering weight and manufacturing costs. The novel assembly and support cradle allow for a variety of mounts to be employed in mounting the roller tube in the assembly. Moreover, a reduced diameter roller tube can be used, since the sheet material and roller tube are supported over the length of the roller tube, enabling a solar screen system to significantly reduce the size required to house the roller tube, as compared to prior art systems. For example, a solar screen housing provided by the present invention may be only about 3 inches by 3 inches in cross-section for a given size solar screen, whereas the prior art devices require larger diameter roller tubes for the same size solar screen and are typically 8 inches by 8 inches or greater in cross-section.

While the present invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A roller tube support mechanism comprising:
   a roller tube including a roller tube body, said roller tube configured to support sheet material wound around said roller tube body between a first end and a second end of said roller tube body;
   an assembly including a first mount and a second mount opposite said first mount to provide both rotary support and translational support to said roller tube, with each of said first mount and said second mount including at least one slot formed in said assembly at each of said first end and said second end respectively, said at least one slot including a central slot bounded by two opposing side slots, wherein said central slot is configured to support an idler and said opposing side slots are configured to support at least one of a motor and a drive gear; and
   an elongated stationary support cradle having a length substantially coextensive with a length of said roller tube body, said support cradle being coupled to said assembly between said first mount and said second mount, said support cradle configured to support said roller tube body substantially along the entire length thereof.

2. The support mechanism of claim 1 wherein said roller tube body has a sheet material wound therearound.

3. The support mechanism of claim 2 wherein said sheet material is one of a screen and fabric configured to shade sunlight.

4. The support mechanism of claim 2 wherein said assembly is configured to releasably contain said roller tube and sheet material thereon and discharge said sheet material proximate said support cradle.

5. The support mechanism of claim 1 wherein:
   said roller tube body has a sheet material wound therearound; and
   said at least one slot is configured to guide and support said roller tube responsive to a variable diameter of said roller tube and sheet material.

6. The support mechanism of claim 1 further comprising:
   a slotted insert adapted to couple with each of said first mount and said second mount.

7. The support mechanism of claim 1 wherein each of said first mount and said second mount include a pivot arm assembly configured to support said roller tube.

8. The support mechanism of claim 7 wherein said pivot arm assembly is pivotably coupled to said assembly proximate said first mount and said second mount respectfully and concealable in the interior of said assembly.

9. The support mechanism of claim 7 wherein said pivot arm assembly includes an idler receiver and a set of opposing receivers adjacent said idler receiver.

10. The support mechanism of claim 7 wherein:
    said roller tube body has a sheet material wound therearound; and
    said pivot arm assembly is configured to guide and support said roller tube responsive to a variable diameter of said roller tube and sheet material.

11. The support mechanism of claim 1 wherein said support cradle is fixed with respect to said assembly and said roller tube.

12. The support mechanism of claim 1 wherein said support cradle is crescent shaped.

13. The support mechanism of claim 2 wherein said support cradle contacts said sheet material proximate a lower portion of said roller tube.

14. The support mechanism of claim 1 wherein said support cradle is formed integral with said assembly.

15. The support mechanism of claim 2 wherein said support cradle supports said roller tube and sheet material below an axis of rotation of said roller tube.

16. The support mechanism of claim 2 wherein said support cradle continuously supports said roller tube body and said sheet material along said length responsive to variation of a diameter of the sheet material wound around said roller tube body resulting from winding and unwinding said sheet material around said roller tube body.

17. The support mechanism of claim 1 wherein said support cradle comprises at least one of a high-density polyurethane material and PVC material.

18. A roller tube support mechanism comprising:
    a roller tube including a roller tube body, said roller tube configured to support sheet material wound around said roller tube body between a first end and a second end of said roller tube body;
    an assembly including a first mount and a second mount opposite said first mount, said assembly configured to support said roller tube; and
    an elongated stationary support cradle having a length substantially coextensive with a length of said roller tube body, said support cradle being coupled to said assembly between said first mount and said second mount, said support cradle configured to support said roller tube body substantially along the entire length thereof;
    a slotted insert adapted to couple with each of said first mount and said second mount;
    wherein said slotted insert includes an idler groove between a pair of side grooves, said pair of side grooves configured to support at least one of a motor bearing and a drive gear bearing.

19. The support mechanism of claim 18 wherein said slotted insert is concealable in an interior of said assembly.

* * * * *